US006965658B1

(12) United States Patent
Lindqvist et al.

(10) Patent No.: US 6,965,658 B1
(45) Date of Patent: Nov. 15, 2005

(54) METHOD AND MEANS FOR TELECOMMUNICATION

(75) Inventors: Dan Anders Lindqvist, Sollentuna (SE); Jacob Kristian Österling, Stockholm (SE); Karl-Gösta Emar Sahlman, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 901 days.

(21) Appl. No.: 09/689,764

(22) Filed: Oct. 13, 2000

(30) Foreign Application Priority Data

Oct. 15, 1999 (SE) ..................................... 9903718

(51) Int. Cl.⁷ .............................................. H04L 1/02
(52) U.S. Cl. ..................................... 375/347; 375/349
(58) Field of Search ....................... 330/129; 455/33.1, 455/340, 132, 133, 135, 134, 140; 370/95.3, 370/279; 342/92, 150; 341/141, 139, 155; 327/351; 375/267, 347, 350

(56) References Cited

U.S. PATENT DOCUMENTS

| 4,129,864 A | | 12/1978 | Carpenter et al. |
| 5,109,392 A | * | 4/1992 | McDonald .................... 375/331 |
| 5,111,202 A | | 5/1992 | Rivera et al. |
| 5,276,685 A | | 1/1994 | Kepler et al. |
| 5,600,317 A | | 2/1997 | Knoth et al. |
| 5,621,770 A | * | 4/1997 | Zastera ......................... 375/347 |
| 5,710,995 A | * | 1/1998 | Akaiwa et al. ............ 455/277.2 |
| 5,714,956 A | | 2/1998 | Jahne et al. |
| 5,940,452 A | * | 8/1999 | Rich ............................ 375/347 |
| 6,031,478 A | | 2/2000 | Oberhammer et al. |
| 6,044,253 A | * | 3/2000 | Tsumura ................... 455/234.1 |

FOREIGN PATENT DOCUMENTS

| EP | 0351788 | 1/1990 |
| WO | WO9610868 | 4/1996 |

OTHER PUBLICATIONS

International Search Report Application No. PCT/SE00/01946.

* cited by examiner

Primary Examiner—Don N. Vo (57) ABSTRACT

The present invention relates to methods and or receiving analogue signals varying within a large signal range in for instance a radio communication system. A receiver (300) includes an un-attenuated signal receiver branch (303) with a first dynamic range and at least one attenuated signal receiver branch (304) with a second dynamic range. The attenuated signal receiver branch (304) is arranged in such a way that the second dynamic range is partly overlapping the first dynamic range and together with the first dynamic range cover the large signal range of the analogue signals. The attenuated signal receiver branch (304) includes an attenuator (306) which attenuate the amplitude of an input signal by a certain value to acquire the desired overlapping second dynamic range. The signal receiver branches are connected to a third block 308 which selects between sampled bursts from the respective signal receiver branch for further processing in the receiver.

22 Claims, 9 Drawing Sheets

METHOD AND MEANS FOR TELECOMMUNICATION

This application claims priority under 35 U.S.C §§ 119 and/or 365 to 9903718-6 filed in Sweden on Oct. 15, 1999; the entire content of which is hereby incorporated by reference.

TECHNICAL FIELD OF THE INVENTION

The present invention relates in general to the field of telecommunication and, in particular, to methods and means for receiving signals with a large signal range in a telecommunication system, e.g. a cellular radio communication system.

DESCRIPTION OF RELATED ART

By "radio unit" is meant all portable and non-portable equipment intended for radio communication, like mobile/cellular phones, transceivers, pagers, telex, electronic notebooks, laptops with integrated radios, communicators, computers, routers, tailored microchips or any other electronic equipment using a radio link as a mean of communication. These equipments can be used in any type of radio communication system, such as cellular networks, satellite or small local networks.

Cellular radio communication systems, e.g. AMPS, NMT, D-AMPS, GSM, and IS-95 (CDMA), are commonly employed to provide speech and data communications to a plurality of subscribers with radio units. A key block in such systems is the receiver which receives and detects the transmitted information in the cellular radio communication systems.

A receiver may be arranged as a separate unit or as an integrated unit together with a transmitter, i.e. a transceiver, in e.g. a radio unit, a base station or a base transceiver station.

A parameter for a receiver signal performance measure is the dynamic range. The dynamic range is defined by the quotient between the input signal power that causes the output signal to just reach the level where the amplitude of the input signal is starting to become limited (distorted), and the input signal power that generates the lowest detectable input signal. An amplitude modulated signal can not be correctly received when the amplitude of the signal is starting to become limited, e.g. due to limiting effects in used components. A dynamic range for a receiver can as an example be 80 dB.

GMSK (Gaussian Minimum Shift Keying) is a modulation technique used in e.g. GSM. This is a narrow-band, digital modulation technique which is based on phase shift keying (PSK). The signal is filtered with a filter with a gaussian impulse response. Each symbol in GMSK contains one bit. GMSK is a "constant envelope" modulation technique where the transmitted information, e.g. data or speech, only impacts the signal phase. Hence, the amplitude does not contain any information regarding the transmitted information. Consequently, only a small loss of signal quality is caused by an amplitude limiting in the receiver, and thus a limiter can be used to achieve the high dynamic range required by the GSM specification 05.05. Eight-quadrature-phase-shift keying (8-QPSK) is a modulation technique used in e.g. EDGE (Enhanced Data rates for GSM Evolution). Each symbol in 8-QPSK contains tree bits. This means that the bit rate can be increased compared to the GMSK modulation with a constant spectrum usage. This modulation technique has a varying envelope (signal amplitude) as opposed to GMSK. The information in an 8-QPSK modulated signal is embedded in both the phase and the amplitude. Consequently, both the phase and the amplitude must be preserved throughout the receiver. No amplitude limiting is allowed. Since the same requirement for dynamic range of the receiver as for GSMK applies (GSM 05.05), the increased dynamic range requirement must be achieved in another way than before. The 8-QPSK is an example of a varying envelope modulation technique which require non-limiting components, i.e. no limiting effects, to be received correctly as opposed to GMSK which is a constant envelope modulation technique where limiting effects from non-linear components can be neglected. Other examples of varying envelope modulation techniques, which requires non-limiting components are Quadrature Phase Shift Keying (QPSK), Quadrature Amplitude Modulation (QAM) and 16-Quadrature Amplitude Modulation (16-QAM).

The US patent U.S. Pat. No. 5,276,685 describes a receiver utilising a method for adjusting a received signal to a limited dynamic range of the receiver by utilising Automatic Gain Control (AGC). The receiver comprises a variable gain amplifier controlled by a digital to analogue converter. The gain setting of the variable gain amplifier is based on preceding old signal samples, that might not be valid for the signal sample received afterwards. The AGC-techniue, which is a feedback technique introduces delay in the gain setting and a great risk of loosing signal accuracy is foreseen, resulting in wrong reception and increased bit error rates or other system measures of receiver performance.

U.S. Pat. No. 5,714,956, U.S. Pat. No. 5,600,317 and the EP patent application EP 0351 788 describes methods and means for analogue-digital conversion of an analogue signal with a high dynamic range. The digitalisation of the analogue signal is performed by a plurality of A/D converters, each of which has a different preamplification, so that it is possible to utilise the A/D converter with the most favourable resolution of the momentary signal from which the digital output signal is computed. Hence they make a selection for each bit in the signal. The object is to get more significant bits out of an A/D-converter for audio signals. It should be noted that by using different amplifiers (one for each A/D converter) there will be different delays between the output signals of each amplifier (each amplifier has its own "unique" delay). The amplifiers also cause offset or transmit time errors that have to be eliminated by choosing different computation algorithms in the receiver.

As will be seen herein, each of the methods and means disclosed in these patents are of different types than the methods and means of the present invention.

SUMMARY

The present invention meets a problem related to receiving signals with a large signal range in a telecommunication system, e.g. a radio or fixed telecommunication system.

The problem occurs when the amplitude of a received signal exceeds the dynamic range of the receiver and where the amplitude is needed to demodulate the signal correctly. Some prior art receivers use built-in limiters that limit the received signals to a certain level. This increases the bit error rate for an amplitude modulated signal.

In light of the foregoing, a primary object of the present invention is to provide methods and means for receiving amplitude varying signals with a large signal range.

Another object of the present invention is to provide method and means for optimising the dynamic range of the receiver for signals with varying signal levels.

In a receiver according to the present invention, different signal receiver branches suitable for receiving signals within different signal ranges are arranged to receive an analogue signal. A decision switch is arranged to select between the respective output from the signal receiver branches according to certain criteria's.

According to one embodiment of the receiver, an unattenuated signal receiver branch with a first dynamic range is arranged in parallel with an attenuated signal receiver branch with a second dynamic range to receive signals that vary within a specific signal range. The first and the second dynamic ranges are partly overlapping each other and together cover the entire signal range of the received signals. Both receiver branches are connected to a memory in which the output signals from the receiver branches are stored. The memory is connected to a decision switch which select stored output signals according to certain criteria's to optimise the receiver for the best signal quality.

The inventive receiver is therewith characterised as it appears from the appended claim 1.

A method utilised in the receiver according to the present invention is characterised as it appears from the appended claim 19.

An advantage with the present invention is that it is possible to build a receiver with a high dynamic range using low cost components, e.g. low cost A/D converters and RF-signal parts.

Another advantage is that no feedback errors are introduced.

Still another advantage is that it is possible to build an instant impulse response receiver.

DETAILED DESCRIPTION OF EMBODIMENTS

The present invention relates to methods and means for receiving signals, e.g. for speech and/or data communications, with a high signal range in a communication system. One example is radio signals in a radio communication system.

Figure 1A:
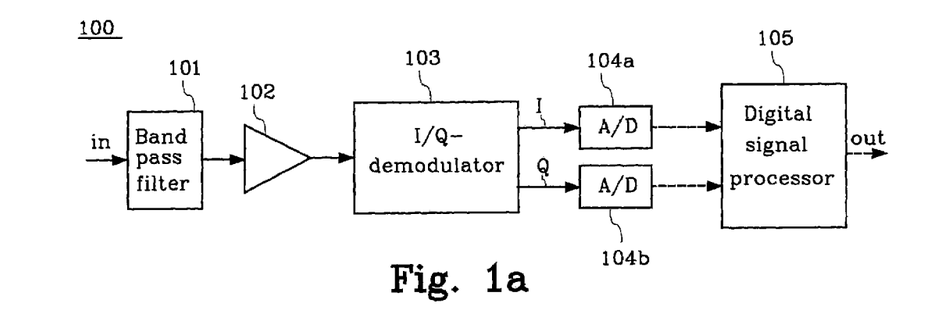
FIGS. 1a–b are illustrating a schematic block diagram of a part of a receiver according prior art.

FIG. 1a illustrates a schematic block diagram of a part of a first receiver 100 according to prior art. Only the part of receiver 100 that is needed to understand the differences between prior art and the invention is illustrated. A band pass filter 101 is connected to a gain block 102 that is connected to an I/Q-demodulator 103. The I/Q-demodulator 103 is also connected to two A/D converters 104a–b, one for the I- and one for the Q-signal. The A/D-converters are further connected to a digital signal processor 105.

The band pass filter is used for reducing the out of band signals disturbing the receiver and the gain block 102 is used for establishing enough gain to receive the lowest required signal correctly. The I/Q-demodulator/downconverter 103 demodulates the incoming IF- or RF-signal, by use of an internal local oscillator in a known manner, the analogue input signal to base band I- and Q-signals which are converted to digital signals by the A/D-converters 104a–b. Digital signal connections are illustrated by dashed lines in the figure. The digital signal processor 105 performs furter signal filtering in the digital domain according to the specified channel bandwidth of the radio/system requirements of the received signal and produces signal samples for further receiver processing like radio channel equalizing and symbol decoding into a received data stream containing the signal message.

The input signal can e.g. be a RF or an IF signal depending on the circuits preceding the filter 101. The band pass filter 101 may be preceded by a number of known components, e.g. a pre-amplifier (a front-end unit) and/or an IF- or RF-mixer, which are omitted in the figure for simplicity. The digital signal processor 105 may be further connected to a number of known components, e.g. equalisers and/or channel decoding means, which are omitted in the figure for simplicity.

Figure 1B:
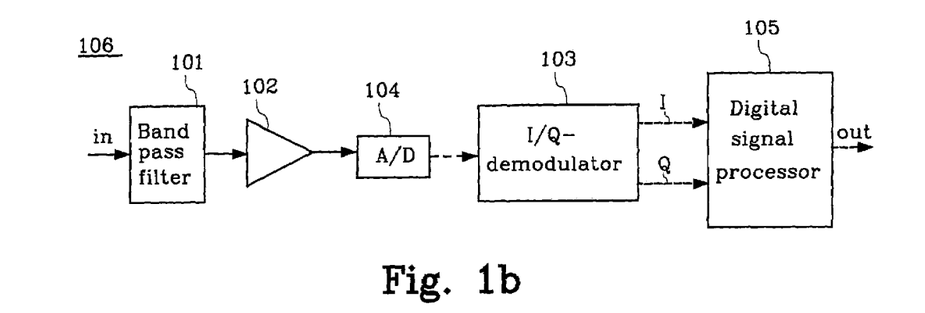

FIG. 1b illustrates a schematic block diagram of a part of a second receiver 106 according to prior art where the A/D-conversion and I/Q-demodulation have switched places compared to receiver 100 in FIG. 1a. This means that the signal from the gain block 102 is A/D-converted before the I/Q-demodulation occurs. Hence, the I/Q-demodulator 103 in FIG. 1b works with digital input signals instead of analogue input signals as in FIG. 1a.

As previously stated, the dynamic range of a unit, e.g. a receiver or A/D-converter, is defined by the quotient between the input signal power, that causes the output signal from the unit to just reach the level where the amplitude of the signal is starting to become limited (deformed), and the input signal power that generates the lowest usable/detectable output signal from the unit. The dynamic range is typical given in dB.

The signal range of a signal is the ratio between the highest input signal strength and the lowest input signal strength during a burst. This means that if the signal range fits the dynamic range of a receiver no limiting effects occur.

Signal quality can be defined as the ratio between the strength of the wanted input signal and the disturbances, e.g. noise added by the receiver, thermal noise into the antenna or interfering radio signals within the bandwidth of the signal. A high signal quality is necessary to achieve a low BER and BLER.

Figure 2:
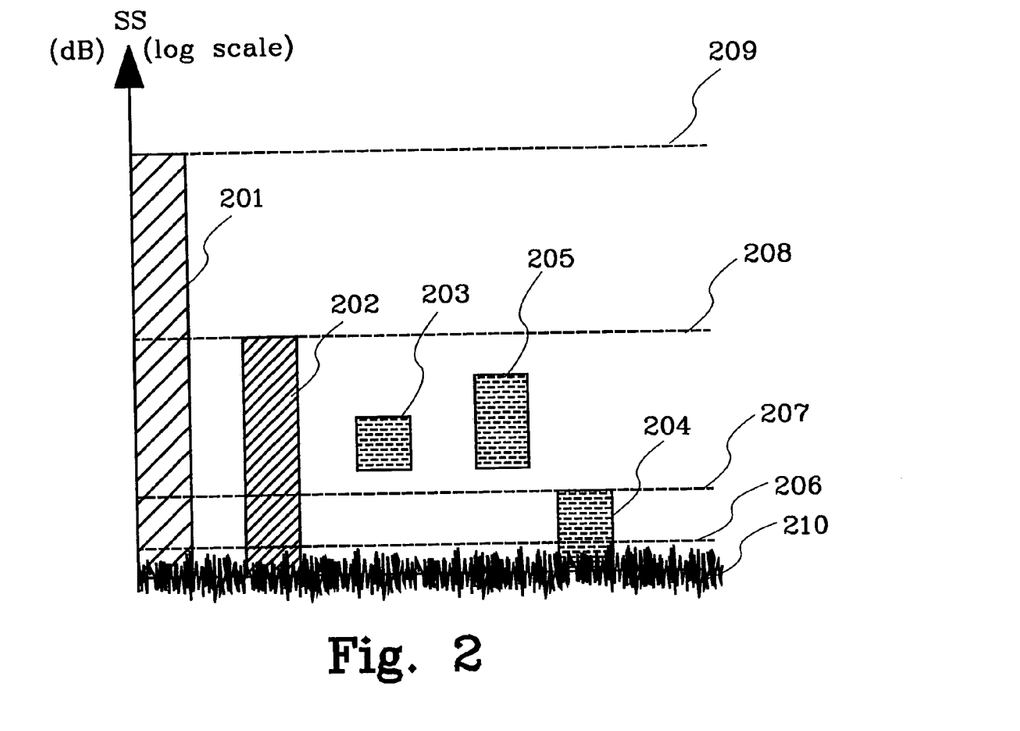
FIG. 2 is illustrating a schematic diagram of signal and dynamic ranges.

FIG. 2 illustrates a schematic diagram where a number of signal and dynamic ranges 201–205 are illustrated in a logarithmic scale (in dB). The dashed line 206 illustrates a required maximum noise level of a receiver, e.g. receiver 100 in FIG. 1a. The dashed line 207 illustrates a required minimum sensitivity of a system in which the receiver will work. The dashed line 208 illustrates a maximum signal level that the receiver can handle. The dashed line 209 illustrates a maximum specified signal level in the system that normally is higher than the dynamic range of the available components/units in the receiver, especially for linear modulation systems like QAM, 8-QPSK etc. The jagged curve 210 illustrates the system noise level required for the receiver.

The signal range 201 illustrates the required signal reception range in the system which means that signals transmitted in the system may have any signal level (e.g. amplitude) within this range.

The dynamic range 202 illustrates the dynamic range of the receiver which is determined by the component/unit in the receiver with the lowest dynamic range, e.g. the A/D-converters 104a–b in FIG. 1a. As seen in FIG. 2, the dynamic range 202 of the receiver is smaller than the signal range 201 of the system. This means that signals, like 8-QPSK, that has signal levels above line 208 (the upper limit of the receivers dynamic range 202) will be received incorrectly (destroyed) by the receiver limiting effects.

The signal range 203 illustrates the required (minimum) signal range of a received signal for achieving an adequate signal reception performance in the receiver (as long as the signal range is within the dynamic range 202 of the receiver). The signal may have a larger signal range, e.g. signal range 205, that fits the dynamic range of the receiver but that will not cause any better signal reception than a signal having a signal range equal to range 203. This adequate signal reception performance can be determined by a number of different signal quality requirements in the system, e.g. Bit Error Rate (BER), Block Error Rate (BLER), Carrier to Interference ratio (C/I) or Carrier to Noise ratio (C/N).

The signal range 204 illustrates a signal at a minimum usable level. The signal just reaches line 207, the minimum sensitivity of the system.

Figure 3:
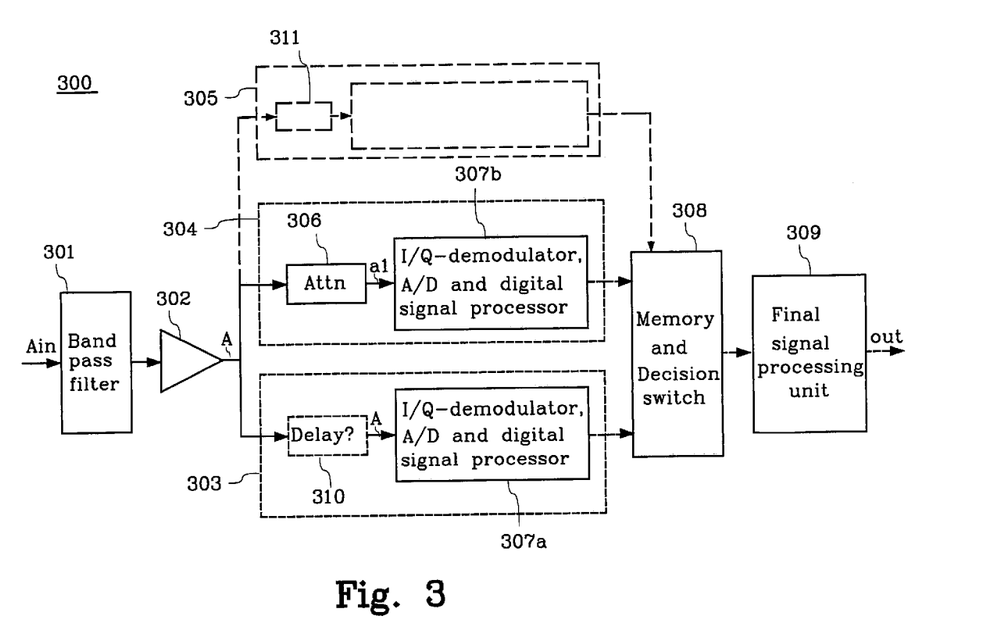
FIG. 3 is illustrating a schematic block diagram of part of a receiver according to the present invention.

FIG. 3 illustrates a schematic block diagram of a part of a receiver 300 according to the present invention. Only the part of receiver 300 that is needed to understand the invention is illustrated. A band pass filter 301 is connected to a gain block 302. The gain block 302 is further connected to a first and a second signal receiver branch 303, 304 respectively. The gain block 302 can also be connected to additional signal receiver branches which is illustrated by the dashed signal receiver branch 305.

The first signal receiver branch 303 includes a delay unit 310 connected to a first block 307a which includes an A/D-converter, an I/Q-demodulator and a digital signal processor. Examples of how the units in the first block 307a could be arranged is disclosed in FIGS. 6a–b. The delay unit 310 can be omitted in most implementations. This is illustrated in FIG. 3 by the dashed line of the delay unit 310. The first signal receiver branch is referred to as the non-attenuated signal receiver branch.

The second signal receiver branch 304 includes an attenuator 306 connected to a second block 307b which also includes an A/D-converter, an I/Q-demodulator and a digital signal processor. Examples of how the units in the second block 307b could be arranged is also disclosed in FIGS. 6a–b. The attenuator 306 attenuate the signal strength (amplitude) of an incoming signal by a certain value, normally set in dB, set so the required dynamic levels in the second signal receiver branch is fulfilled. If one or more additional signal receiver branch are used, e.g. branch 305, each one of their attenuators have a unique attenuation, e.g. A dB in branch 304 and B dB in branch 305. The signal receiver branches with an attenuation above 0 dB, e.g. branch 304 and 305, are referred to as the attenuated signal receiver branches in this application. The attenuator 306 can as an example be a resistor network (a passive and linear component). The resistor causes normally no or a very limited delay. But if it will cause a delay it is easy to add an extra resistor network (the delay unit 310) with zero or nearly zero attenuation to the first (un-attenuated) receiver branch 303 to achieve the same delay in both the attenuated and the un-attenuated signal receiver branch 304, 303 respectively. This means that the first (un-attenuated) signal receiver branch 303 is essentially un-attenuated even if a resistor is used as the delay unit 310.

The signal receiver branches are connected to a third block 308 including a memory for storing the output signals from the signal receiver branches, a calculation unit for calculation of signal strength values etc for each incoming signal sample and a decision switch to decide which one of the stored signals that will be forwarded for further processing in the receiver. This means that all signal receiver branches are used to receive the same signal, but only one of their output signals will be further used in the receiver for each signal sample. The decision in the decision switch can be made for each received signal burst (on a burst by burst basis) or for one or more consecutive samples in each signal burst (on a sample by sample basis). Old stored signals can be flushed to save memory.

Figure 8:
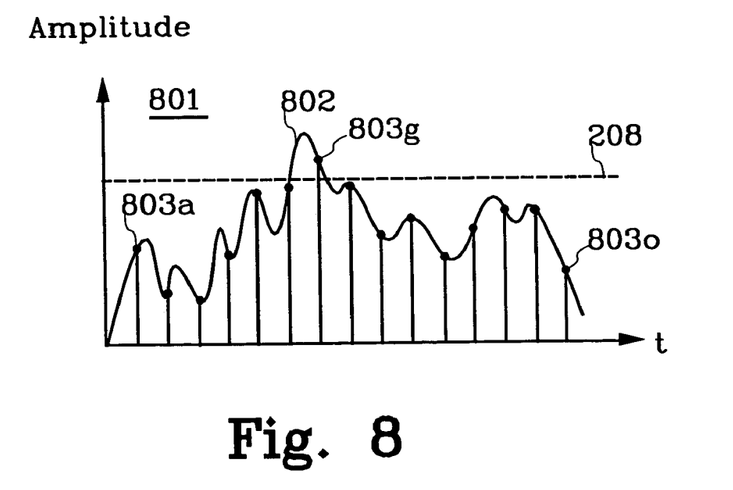
FIG. 8 is illustrating a graph of a signal burst and a number of digital samples.

FIG. 8 illustrates a signal burst 801. A signal burst can be defined as signal that is transmitted or received under a limited and pre-defined time period, e.g. a time slot in a TDMA frame. A receiver normally receives a number of consecutive signal bursts from a transmitter. This means that each burst can be a part of the received analogue signal. The signal is digitised in the A/D-converters whereby the analogue signal 802 is converted to digital samples 803a–o that represents the information in the signal. Each sample 803a–o includes an I/Q-pair (one I- and one Q-signal value).

The third block 308 is connected to a final signal processing unit 309 that receives the selected burst signal samples from the decision switch, and performs (radio) channel equalising and received signal decoding into data bits containing the signal message. The message is then forwarded for further processing according to the system requirements.

Figure 4:
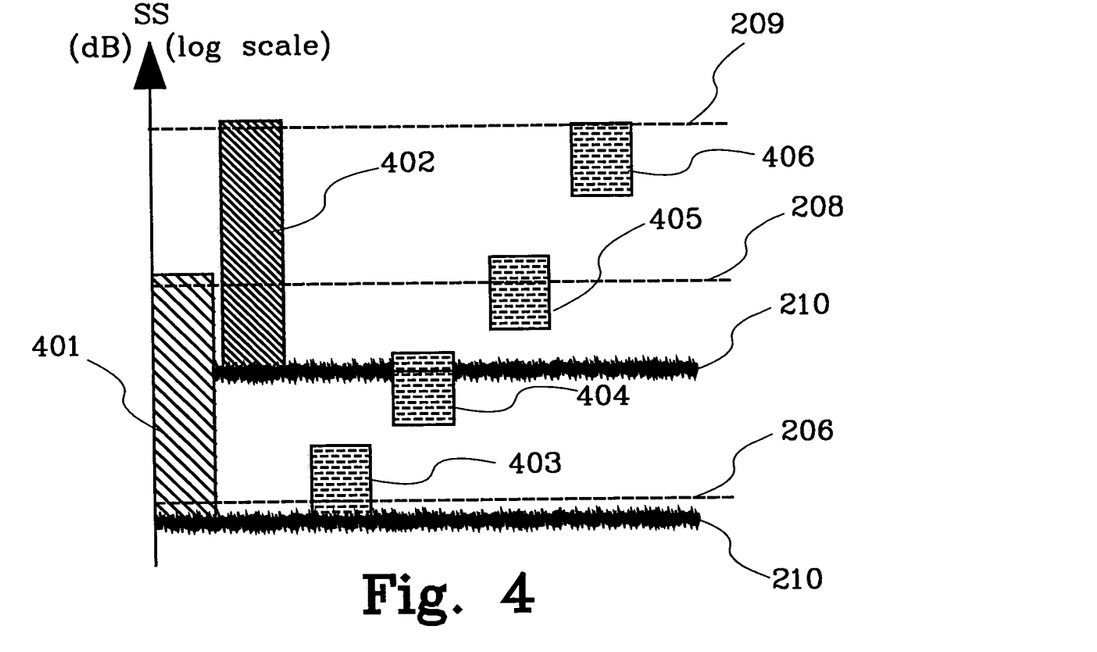
FIG. 4 is illustrating a schematic diagram of signal and dynamic ranges in a receiver according to the present invention.

FIG. 4 illustrates a schematic diagram of the dynamic ranges of the first and second receiver branches. The dynamic range 401 illustrates the dynamic range of the first receiver branch 303 and the partly overlapping dynamic range 402 illustrates the dynamic range of the second receiver branch 304. The overlap should be at least equal to the required (minimum) signal range for receiving an adequate signal reception performance in the receiver 300, i.e. the signal range 203 in FIG. 2. By providing these two partly overlapping dynamic ranges the entire required signal (reception) range 201 in the system (between line 206 and 209) is covered by the receiver 300. The dashed line 208 represents a threshold level/point or decision level/point for the selection of from which signal receiver branch in the receiver the signal samples of a burst is forwarded. The noise level 210 according to FIG. 2 is also shown in FIG. 4 to illustrate what the attenuation of the second receiver branch 304 influences the lowest signal level that can be utilized in the second receiver branch.

It is the difference in attenuation between the signal receiver branches 303 and 304 that has the effect of moving up the dynamic range 402 in FIG. 4 a number of dB compared to the dynamic range 401.

The ranges 403 and 404 illustrate two signal ranges (the signal amplitude span) of signals, e.g. a burst or a sample, with a peak signal level below line 208, i.e. with a signal range within the dynamic range 401 of the first receiver branch. They can without any problems be received and processed through the first (un-attenuared) receiver branch. When these signals are processed through the second (attenuated) receiver branch 304 the amplitude of these signals are attenuated, see 704 in FIG. 7*b*, which means that there is a risk that the signal range of the signals becomes to small to be correctly received (i.e. smaller the required minimum signal range 203). These signals will therefore go undisturbed through the first (unattenuated) receiver branch 303 (i.e. have a high signal quality), and will be hidden in the noise in the other attenuated signal receiver branches (i.e. have a low signal quality).

The ranges 405 and 406 illustrate two signal ranges (the signal amplitude span) of signals, e.g. a burst, with a peak signal level above line 208, i.e. with a signal range within the dynamic range 402 of the second receiver branch. These signals can not be received correctly via the first (un-attenuated) signal receiver branch 303 because the amplitude of these signals will become limited, see 702 in FIG. 7*a* (resulting in a low signal quality). These signals have larger amplitudes than the first receiver branch 303 can handle, i.e. the signals have a signal range that reaches outside the dynamic range 401 of the first receiver branch 303. When these signals are processed through the second (attenuated) receiver branch 304 the amplitudes are attenuated, see 704 in FIG. 7*b*, before they are processed in the second receiver branch 304. These signals will therefore maintain all the amplitude information due to the fact that they had such a high signal level from the beginning and do not risk to become to small after the attenuation. These signals will therefore get a high signal quality despite the attenuation. This means that the second dynamic range 402 is moved up when it is compared to the first dynamic range 401 as illustrated in FIG. 4.

The signal selection by the decision switch in the third block 308 can as an first example be performed by comparing the signal strength of each stored signal sample corresponding to the same part of the received analogue signal, whereby the sample with the highest signal quality is selected. A second example is to compare the signal strength of each stored signal sample, corresponding to the same part of the received analogue signal, with a determined threshold level for each signal receiver branch (i.e. a set of pre-determined threshold levels are used), whereby the sample with a signal strength exceeding the corresponding threshold level and signal receiver branch is selected.

In a third example, stored signal samples received via the attenuated signal receiver branches are evaluated according to the first or second example above, i.e. compared with each other or to specific threshold levels. If no sample has been selected after the evaluation as described above, the sample received via the first (un-attenuated) signal receiver branch is selected.

In a fourth example stored signal samples received from an attenuated signal receiver branch are selected if any of the previous N samples exceeded the corresponding threshold level of the attenuated signal receiver.

These examples illustrates that the receiver performance is optimised for each sample by selecting samples received via that particular signal receiver branch that generates the highest signal strength quality for that specific part of the analogue signal. If for example only the first 303 and the second 304 signal receiver branch is used, signals received via the second (attenuated) signal receiver branch 304 and having a signal level above the threshold level 208 in FIG. 4 will get the highest signal quality.

The decision switch may also select all samples corresponding to a sampled burst and received via one of the signal receiver branches at the same time, i.e. on a burst by burst basis, whereby the signal quality of the whole burst is used to determine which stored burst to select.

The selections in the decision switch are repeated for each sampled burst or digital sample. This means that when a sampled burst or a digital sample from a certain receiver branch is selected, the other stored samples/bursts from the other signal receiver branches are neglected.

Sampled bursts from the first signal receiver branch can be selected as default as long as the other signal receiver branches does not generate any sampled bursts with a signal strength or quality above a pre-determined signal strength/quality level. As an alternative, the sampled bursts from the first signal receiver branch can be selected as a default as long as the sampled bursts have a signal strength or quality within a pre-determined signal strength/quality interval.

The selection can in a further alternative use older selections as a guide for the selection. If the decision switch selected a sample/burst received by the second (attenuated) signal receiver branch 304 the next N samples/bursts (where N is an integer) will also be selected from the second branch 304. This can as an example mean that a sampled burst can be selected for further processing in the receiver by evaluating a pre-determined number of digital samples in the sampled bursts, e.g. the 10 first digital samples, from the respective signal receiver branch. A similar alternative looks at the N latest samples/bursts and selects the second (attenuated) branch 304 if one of these N last samples/bursts have been selected from the second branch 304. These alternatives can be used if there are noticeable recovery times for the filters in the first (unattenuated) receiver branch 303 and specially if the selection is on a sample by sample basis.

Figure 5:
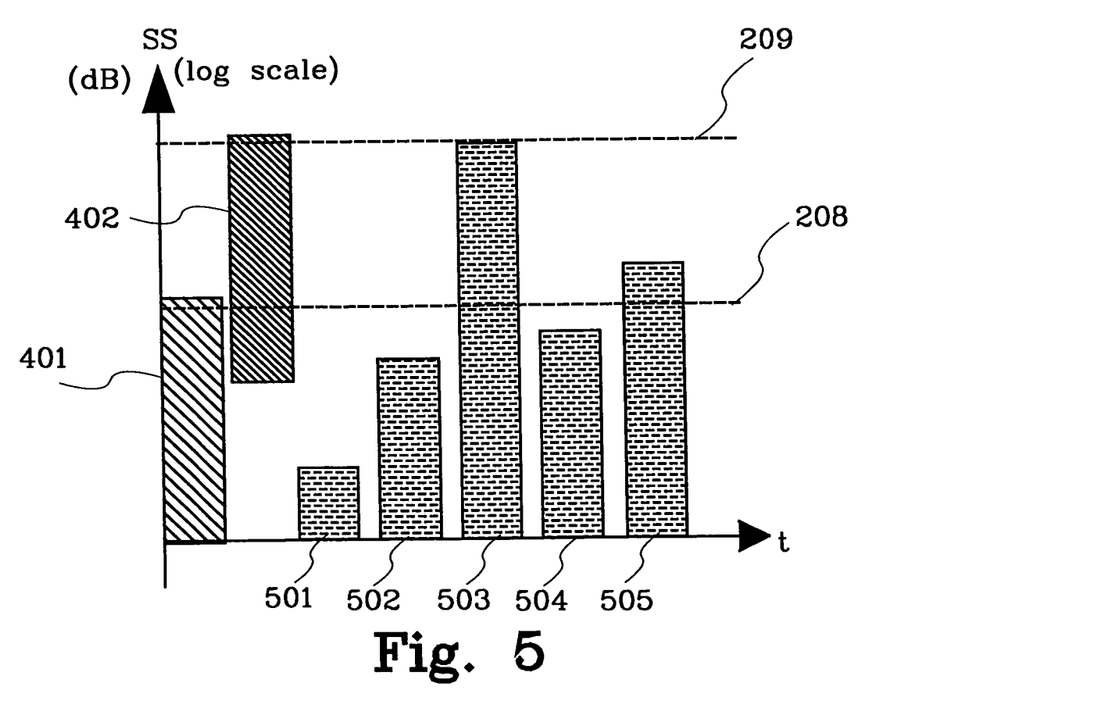
FIG. 5 is illustrating a schematic diagram of peak amplitudes for a plurality of received bursts.

FIG. 5 illustrates a schematic diagram of incoming signal peak amplitudes 501–505 of a plurality of received signal bursts in relation to the noise level specified for the system. The partly overlapping dynamic ranges 401 and 402 of the first and second receiver branches 303, 304 respectively are illustrated together with peak amplitudes 501–505 of the five different burst. Each of these bursts are received by both signal receiver branches and their corresponding digital samples are stored in the memory in block 308. The decision switch compares the signal strength of each stored sample with the decision level 208. The decision switch selects the bursts processed through the second branch 304 if one or more of their samples have a signal strength (peak amplitude) above the decision level 208, i.e. for 503 and 505, otherwise the first branch 303 is selected, i.e. for 501, 502 and 504. Due to the overlap between 401 and 402 all bursts with a peak amplitude reaching above the decision level will have a signal level sufficiently above the noise-level (210) of the second receiver branch (304) to be received by said second receiver branch with enough signal quality.

Figure 6A:
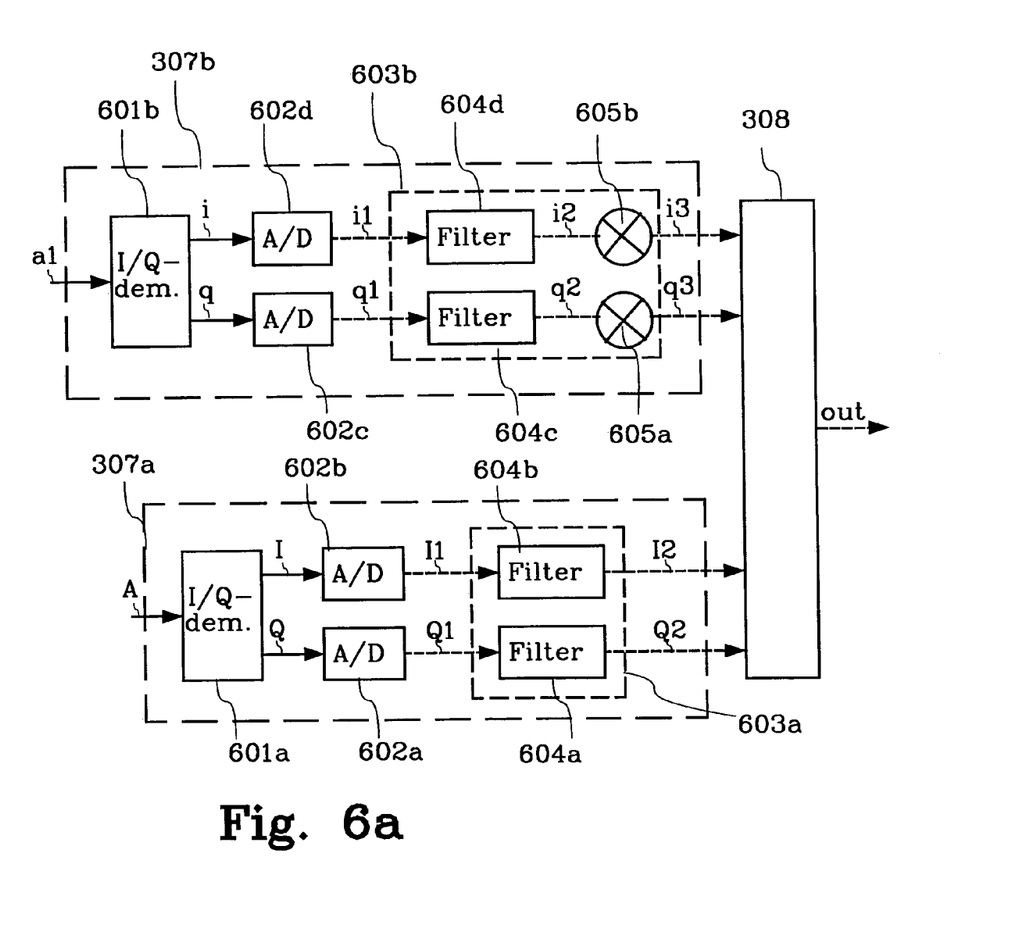
FIGS. 6a–b are illustrating schematic block diagrams of parts of a receiver according to the present invention.

FIG. 6*a* illustrates a block diagram of a first embodiment of the first and second block 307*a–b* according FIG. 3 where the input signal is I/Q-demodulated before A/D conversion. The first block 307*a* connected between the delay unit 310, or the gain block 302 if the delay unit 310 is omitted, and the third block 308, includes a first downconverter-I/Q-demodulator 601*a* connected to a first and a second A/D-converter 602*a–b*. The A/D-converters 602*a–b* are both connected to a first digital signal processor 603a. The outputs I2 and Q2 from the first signal processor 603a are connected to the third block 308. The first signal processor performs digital channel filtering, i.e. acts as a digital filter 604a–b, on the digital I- and Q-signals from the A/D-converters 602a–b.

The second block 307b, connected between the attenuator 306 and the third block 308, includes a second I/Q-demodulator 601b connected to a third and a fourth A/D-converter 602c–d which are both connected to a second digital signal processor 603b. The outputs i3 and q3 from the second signal processor 603b are connected to the third block 308. The second signal processor 603b performs digital filtering, i.e. acts as a digital filter 604c–d, on the digital I- and Q-signals from the third and fourth A/D-converters. The second signal processor 603b also performs digital amplifying, i.e. acts as a digital amplifier 605a–b, on the filtered I- and Q-signals by vector multiplication according to the value set by the inverse of the linear (i.e. not a logarithmic value) attenuation value of the attenator 306. The amplification is a compensation for the attenuation in the attenuator 306 to be able to have information of the input signal received strength to be delivered to the system. Other compensation factors can also be used by multiplying in the same way to compensate for the receiver temperature drift and frequency correction, i.e. the receiver characteristics change versus received frequency channel etc.

This compensation is an exact compensation of the attenuation in the attenuator 306. The compensation can also be a partial compensation in some implementations.

Figure 7A:
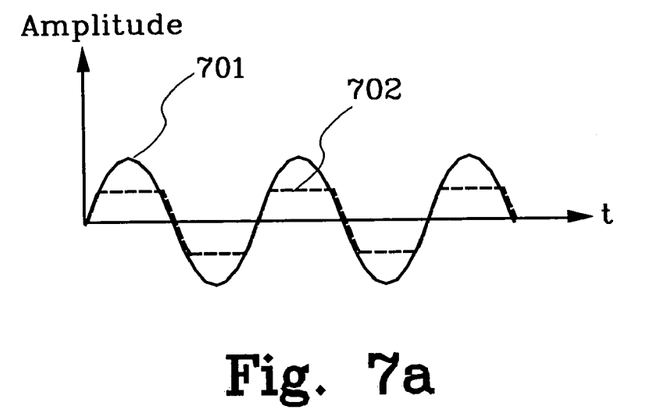
FIG. 7a is illustrating a graph of an example of un-limited and limited signals.

This means that for each sample from a received signal burst there is an I- and an Q-signal stored in the memory (an I/Q-pair) in the third block 308. The resulting signal strength SS can then be calculated as SS=$(I^2+Q^2)^{1/2}$. By using both the I- and the Q-signal any limiting problems (as illustrated in FIG. 7a) caused by the I/Q-demodulators or A/D-converters are avoided.

Figure 6B:
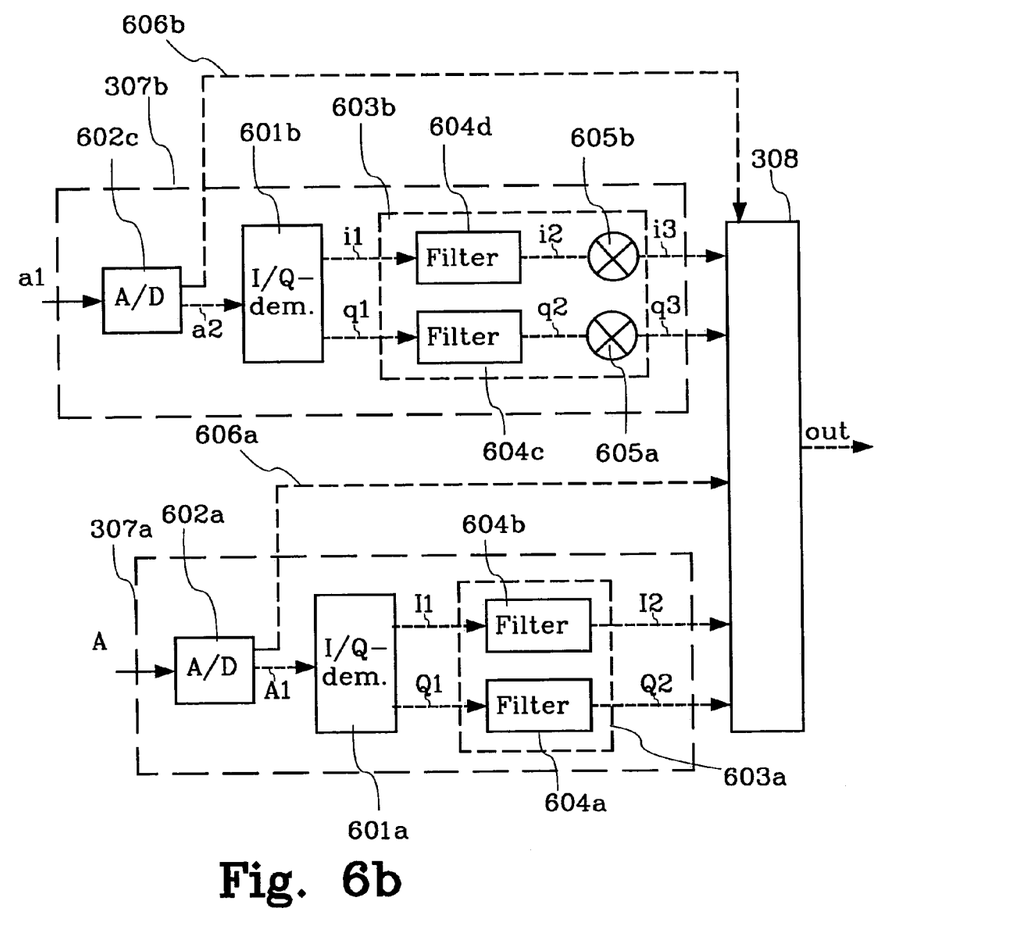

FIG. 6b illustrates a block diagram of a second and a third embodiment of the first and second block 307a–b according to FIG. 3. The difference compared to the first embodiment is that the input signal is A/D converted before I/Q-demodulation. In these embodiments one digital I/Q demodulator and one A/D-converter are used in each signal receiver branch. The dashed lines 606a–b are not included in the second embodiment.

In the third embodiment the digital end of the A/D-converters 602a and 602c are also connected to the third block 308 (illustrated by the dashed lines 606a–b). This makes it possible for the decision switch to make an early decision from which signal receiver branch a received signal burst is to be selected. The third block 308 does not need to calculate the SS=$(I^2+Q^2)^{1/2}$ value mentioned above. The I- and Q- signals are still comprised in one and the same signal after the A/D-converters 602a and 602c. But as the A/D-conversion value in this case for each sample contains information about the signal strength earlier decision is possible, thus saving digital downconversion and filtering efforts that later will be thrown away.

If the decision switch on a sample by sample basis a time-compensation τ is needed on the connections 606a–b to compensate for the delay of the I- and Q signals through processors 603a–b. But if the decision switch selects and on a burst by burst basis no time-compensation τ is needed.

The digital signal processors 603a–b utilising the digital filtering for all branches and amplification for the attenuated branches can as an example be implemented as Digital Signal Processors (DSP). The digital filter functions in the digital signal processors can be chosen to optimise the respective signal receiver branch with respect to signal to interference ratio (C/I) and/or signal to noise (C/N) ratio, e.g. by choosing different filter slopes for each filter 604a–d depending on where the dynamic range is used in the particular receiver branch.

The digital amplification is performed by multipliers that multiplies the digital signal with a certain amplification value. If for example the attenuation in the attenuator 306 is A (A<1) the amplification value can be selected as $1/\sqrt{A}$ to compensate the attenaution.

All the units, e.g. the A/D-converters, in the first and second signal receiver branch have a certain dynamic range (equal to or different from the other units in the respective branch). The dynamic ranges 401 and 402 of the first and second signal receiver branch 303, 304 respectively are determined by the unit that has the lowest dynamic range in the respective signal receiver branch. This means that normally the A/D-converters 602a–d or I/Q-demodulators 601a–b defines the dynamic range of the first and second signal receiver branch 303, 304 respectively.

FIG. 7a illustrates an example of an un-limited signal 701 (e.g. an 8-QPSK signal) and a limited signal 702 (e.g. a GMSK signal). The limited signal 702 is illustrated with a dashed line. A signal can as an example be limited by an A/D-converter or an I/Q-demodulator if the signal has a larger dynamic range than the converter or demodulator.

Figure 7B:
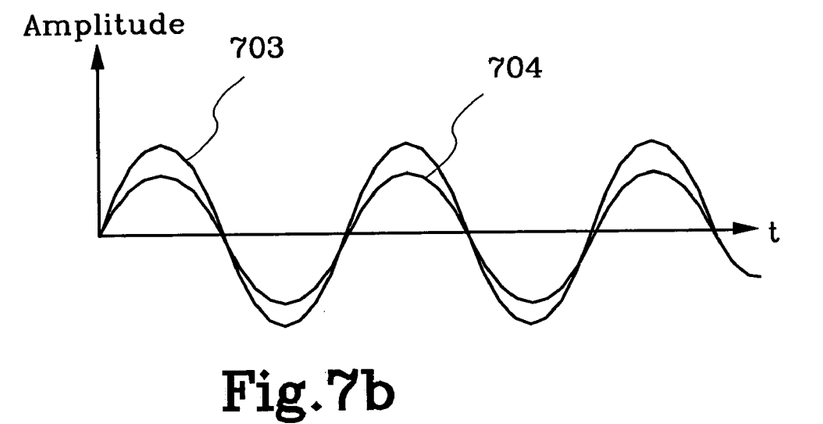
FIG. 7b is illustrating a graph of an example of un-attenuated and attenuated signals.

FIG. 7b illustrates an example of an un-attenuated signal 703 and an attenuated signal 704.

FIG. 8 illustrates a signal burst and a number of digital samples and has been described in connection with the text to FIG. 3.

Figure 9:
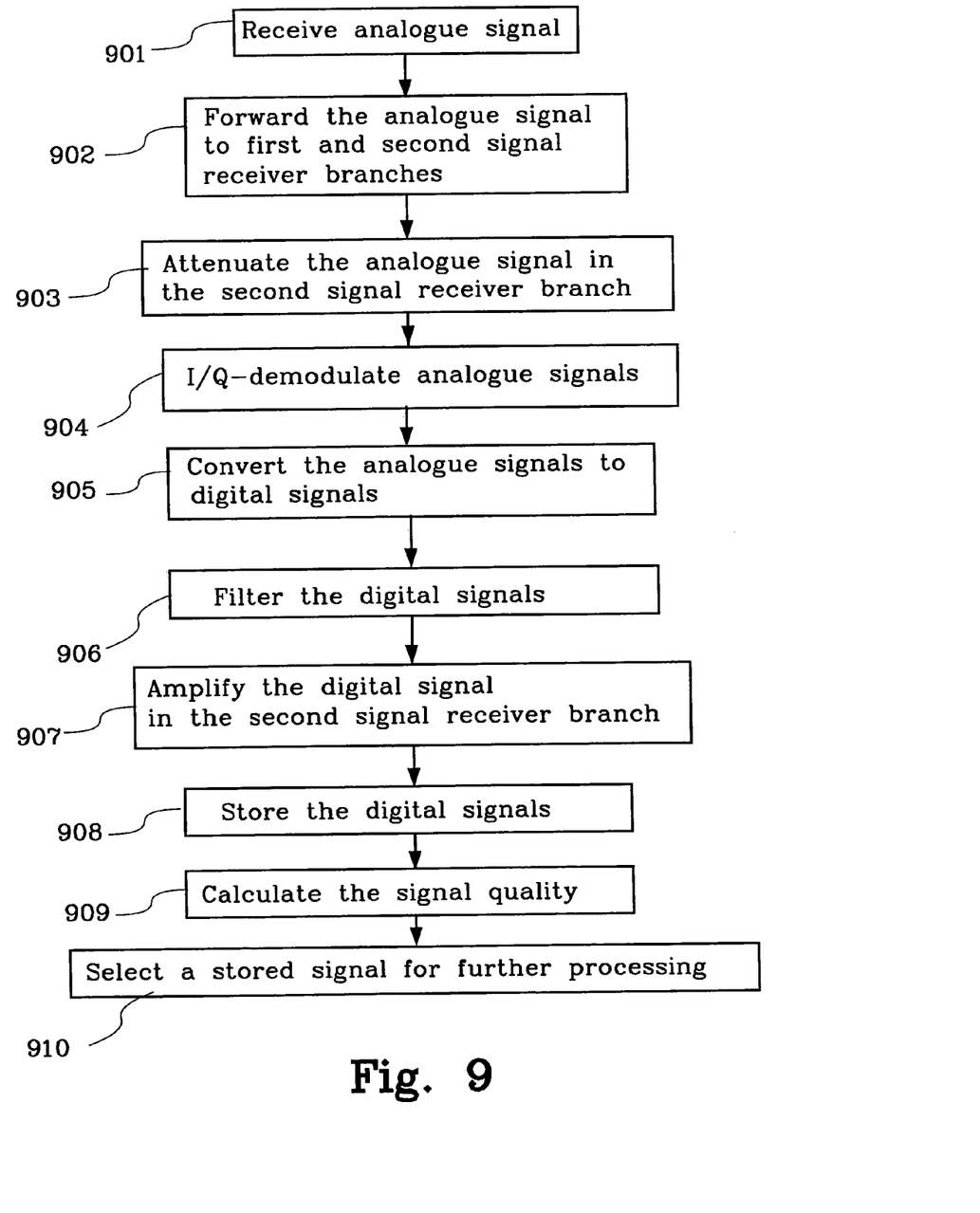
FIG. 9 is illustrating a flow chart of a first embodiment of a method according to the present invention.

FIG. 9 illustrates a flow chart of a first embodiment of a method according to the present invention. References in the text below will also be made to FIGS. 3 and 6a.

According to a step 901 in FIG. 9, the receiver 300 receives an analogue signal $A_{in}$ which is filtered in the bandpass filter 301 and amplified in the gain block 302 to a first analogue signal A.

According to a step 902, the receiver forwards the first analogue signal A to the first and second signal receiver branches 303 and 304.

According to a step 903, the attenuator 306 attenuates the first analogue signal A, in the second signal receiver branch 304, to an attenuated analogue signal a1. Attenuated and amplified signals will be given small letters, e.g. a1 or q1, and un-attenuated signals will be given capital letters, e.g. A1 or Q1, in this description.

According to a step 904, the I/Q-demodulators 601a–b in the respective receiver branch demodulates the respective analogue signal. The analogue signal A is demodulated in the first signal receiver branch 303 to un-attenuated I- and Q-signals and the attenuated analogue signal a1 is demodulated in the second signal receiver branch 304 to attenuated i- and q-signals.

According to a step 905, the A/D-converters 602a–d converts the analogue I-, i-, Q- and q-signals to digital signals. The analogue signals I and Q are converted in the first signal receiver branch 303 to un-attenuated digital signals I1, Q1 respectively and the attenuated analogue signals i and q are converted in the second signal receiver branch 304 to attenuated digital signals i1 and q1.

According to a step 906, the digital filters 604a–d in the digital signal processors 603a–b perform receiver channel filtering of the digital signals Q1, I1, q1 and i1 to filtered digital signals. The un-attenuated digital signals Q1, I1 respectively are filtered in the first signal receiver branch 303 to un-attenuated filtered digital signals I2, Q2 respectively and the attenuated digital signals i1, q1 respectively are filtered in the second signal receiver branch 304 to attenuated filtered digital signals i2 and q2.

According to a step 907, the digital amplifiers 605a–b in the digital signal processor 603b amplifies the attenuated filtered digital signals i2 and q2, by digital multiplication, to amplified digital signals i3 and q3 in the second signal receiver branch 303. The amplification can as an example be a full compensation for the analogue attenuation in step 903. According to a step 908, the third block 308 stores the digital signals I2, Q2, i3 and q3 from the first and second signal receiver branch 303, 304 respectively in a memory. Each one of these signals includes a number of digital samples and each sample includes an I/Q-pair.

According to a step 909, the third block 308 calculates the signal strength for each stored sample, i.e. for each I/Q-pair. See text in connection with FIG. 6a for details regarding this calculation.

According to a step 910, the decision switch in the third block 308 selects stored samples corresponding to a signal burst received via one of the signal receiver branches, for further processing in the final signal processing unit 309. For each selection the samples corresponding to the same original analogue signal burst are used. See page 14–15 for more details of how this selection can be performed on a burst by burst basis, a sample by sample basis or by using older selections as a guide for the current selection.

The selected samples/bursts are forwarded to the final signal processing unit 309.

If there are additional attenuated signal receiver branches available in the receiver, e.g. branch 305, the first analogue signal is forwarded to those branches too in step 902 and processed through step 903–908 in a similar way and at the same time as the signal in the second (attenuated) signal receiver branch 304. This means that the decision switch can select between samples/bursts received via one un-attenuated and at least two attenuated receiver branches.

Figure 10:
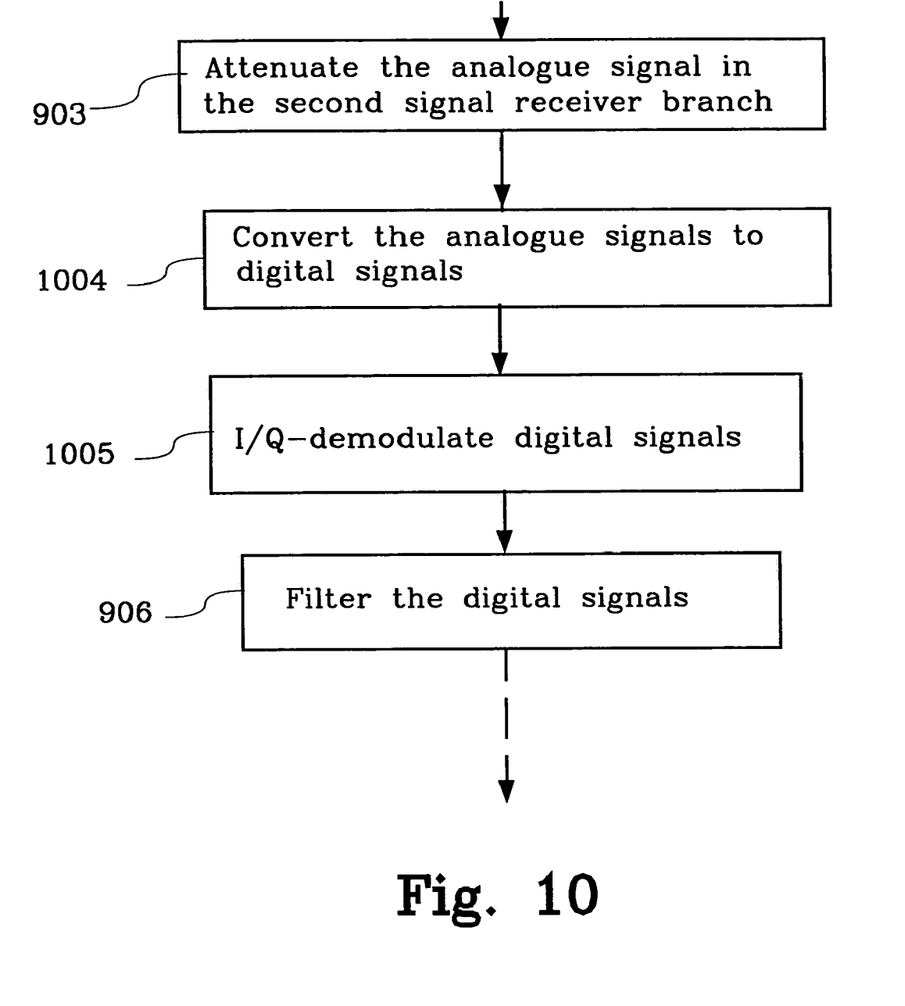
FIG. 10 is illustrating a flow chart of a second embodiment of a method according to the present invention.

FIG. 10 illustrates a flow chart of a second embodiment of a method according to the present invention. References in the text below will also be made to FIGS. 3 and 6b. The first steps 1001–1003 are equal to step 901–903 according to FIG. 9.

According to a step 1004, the A/D-converters 602a and 602c converts the analogue signals to digital signals. The analogue signal A is converted in the first signal receiver branch 303 to an un-attenuated digital signal A1 respectively and the attenuated analogue signal a1 is converted in the second signal receiver branch 304 to attenuated digital signal a2.

According to a step 1005, the I/Q-demodulators 601a–b in the respective receiver branch demodulates the respective digital signal. The digital signal A1 is demodulated in the first signal receiver branch 303 to un-attenuated I1- and Q1-signals and the attenuated digital signal a2 is demodulated in the second signal receiver branch 304 to attenuated i1- and q1-signals.

The last steps 1006–1010 are equal to steps 906–910, according to FIG. 9, and will for simplicity not be described here.

In a third (not illustrated) embodiment of a method according to the present invention the calculation in step 909 is omitted whereby the selection in step 910 is made on the output signals from the A/D-converters 602a and 602c, received via connections 606a–b in FIG. 6b.

The inventive receiver and methods disclosed above uses a solution for receiving a signal with a large signal range that eliminates the risk of losing any received data, e.g. due to time delays, by storing redundant data processed through a plurality of signal receiver branches with different dynamic ranges and selecting the "best" one of the redundant data for further processing.

In general, the inventive receiver can include N signal receiver branches (where N is an integer equal to or bigger than 2) with mutually overlapping dynamic ranges. The overlapping dynamic ranges shall together cover, i.e. fit, the signal range 201 of the received analogue signal (the received analogue signal has a signal level that varies within this first signal range). If N=2, two signal receiver branches, a first 303 and a second 304 signal receiver branch, with their respective dynamic ranges 401, 402 respectively are used to cover the signal range 201 of the received analogue signal. The second one 304 of these signal receiver branches includes an attenuator 306 to attain the dynamic range 402 that partly overlaps the dynamic range 401 of the first signal receiver branch 303 and together with that dynamic range 401 cover the signal range 201 of the received analogue signal.

If three or more signal receiver branches are used (N>2) to cover the signal range 201 each additional signal receiver branch, e.g. the third signal receiver branch 305, includes an attenuator 311 to attain a dynamic range that partly overlaps the neighbouring dynamic range or ranges (they are mutually overlapping). Hence, there is always a difference in attenuation between each signal receiver branch in the receiver 300.

The receiver 300 also comprises means 308 for storing and selecting the output signals from the signal receiver branches for further processing in the receiver.

This means that the inventive receiver will have a total/ resulting dynamic range that can receive the whole signal range of the analogue signal and at the same time select the signal receiver branch that generates the highest signal quality for each received burst or any other pre-defined part of the analogue signal.

Although the invention has mainly been described by referring to a GSM system using EDGE and 8-QPSK modulation the inventive methods and device can be applied to receive other amplitude modulated signals generated in e.g. a fibre communication system or a fixed telecommunication network.

The inventive methods and receiver can completely or partially be implemented as software in one or more Digital Signal Processor circuits with internal or external memory access.

What is claimed is:

1. A receiver for receiving an analogue signal in a communication system, where said analogue signal includes signal bursts that are varying within a first signal range, comprising:

at least two signal receiver branches for receiving said analogue signal, wherein the at least two signal receiver branches are arranged to have dynamic ranges that are partly overlapping each other and together cover said first signal range;

means for evaluating digital samples of said signal bursts from said at least two signal receiver branches in accordance with specific threshold levels; and means for selecting all digital samples corresponding to one signal burst at the same time for further processing in said receiver, and where said one signal burst has been received via one of said at least two signal receiver branches, wherein said at least two signal receiver branches comprises A/D-conversion means, demodulation means and digital filtering means to generate said digital samples.

2. The receiver as claimed in claim 1, wherein said selection means is arranged to make said selection between sampled signal bursts corresponding to the same received signal burst which has been received in parallel by said at least two signal receiver branches.

3. The receiver as claimed in claim 1, wherein at least one of said at least two signal receiver branches comprises attenuation means provided to attain said partly overlapping dynamic ranges.

4. The receiver as claimed in claim 3, wherein the attenuation in said attenuation means is selected in such a way that said overlap between said dynamic ranges is at least equal to a defined required minimum signal range for achieving an adequate signal reception performance in said receiver.

5. The receiver as claimed in claim 3, wherein said attenuation means includes a resistor network.

6. The receiver as claimed in claim 3, wherein said at least one signal receiver branch that comprises attenuation means also includes amplifying means.

7. The receiver as claimed in claim 6, wherein said amplifying means are arranged to amplify digital sampled signal bursts to compensate for the attenuation in said attenuation means.

8. The receiver as claimed in claim 1, wherein one of said at least two signal receiver branches is un-attenuated.

9. The receiver as claimed in claim 1, wherein said means for evaluating said digital samples of said signal bursts includes means for storing said digital samples.

10. The receiver as claimed in claim 9, wherein said means for selecting is arranged to use the signal quality of said stored sampled signal bursts to select said sampled signal burst for further processing in said receiver.

11. The receiver as claimed in claim 9, wherein said means for selecting is arranged to compare the signal strength of said stored digital samples with a set of pre-defined threshold levels to select said sampled signal burst for further processing in said receiver.

12. The receiver as claimed in claim 1, wherein said means for selecting is arranged to select sampled signal bursts from a first one of said at least two signal receiver branches as long as said sampled signal bursts have a signal strength within a pre-determined signal strength interval or a signal quality within a pre-determined signal quality interval.

13. A transceiver, characterised in that said transceiver comprises at least one receiver as claimed in claim 1.

14. A base station, characterised in that said base station comprises at least one transceiver as claimed in claim 13.

15. A radio unit, characterised in that said radio unit comprises at least one receiver as claimed in claim 1.

16. A method in a communication system for receiving an analogue signal in a receiver, where said analogue signal includes signal bursts that are varying within a first signal range, and where said receiver comprises at least two signal receiver branches for receiving said analogue signal, the method comprising:
processing said analogue signal with signal bursts to digital sampled signal bursts in said at least two signal receiver branches where said at least two signal receiver branches are arranged to have dynamic ranges that are partly overlapping each other and together cover said first signal range;
evaluating said digital sampled signal bursts from said at least two signal receiver branches in accordance with specific threshold levels; and
selecting one of said digital sampled signal bursts that has been processed by one of said at least two signal receiver branches for further processing in said receiver,
wherein said step of processing said analogue signal to digital sampled signal bursts comprises the following steps:
attenuating said analogue signal to an attenuated analogue signal in all signal receiver branches except one, whereby one un-attenuated and at least one attenuated analogue signal are attained;
transforming said attenuated and un-attenuated analogue signals to filtered digital sampled signal bursts by I/Q-demodulation AD-conversion and digital channel filtering;
amplifying said filtered digital sampled signal bursts corresponding to said attenuated analogue signals to amplified digital sampled signal bursts to restore the received signal strength,
storing said amplified digital sampled signal bursts and said filtered digital sampled signal bursts corresponding to said un-attenuated analogue signal in a memory in said receiver as said digital sampled signal bursts.

17. The method as claimed in claim 16, wherein said step of selecting performs a selection between sampled signal bursts corresponding to the same received signal burst in said analogue signal, and where said signal burst has been received in parallel by said at least two signal receiver branches.

18. The method as claimed in claim 16, wherein the signal quality of said stored digital sampled signal bursts are used to select said sampled signal burst for further processing in said receiver.

19. The method as claimed in claim 16, wherein the signal strength of said stored digital sampled signal bursts are compared with a set of pre-defined threshold levels to select said sampled signal burst for further processing in said receiver.

20. The method as claimed in claim 16, wherein each one of the digital samples is an I/Q-pair and that said step of evaluating comprises the step of calculating the signal amplitude of said IQ-pairs before said step of selecting.

21. A receiver comprising:
a band-pass filter for receiving an incoming analog signal wherein the analog signal includes signal bursts that are varying within a signal range,
an amplifying means in communication with the band-pass filter for amplifying the incoming analog signal from the band-pass filter,
a plurality of signal receiver branches in communication with the amplifying means, wherein each signal receiver branch attenuates and processes the incoming analog signal into a digital signal such that each signal receiver branches have different dynamic ranges,
a memory for storing the digital signals from the plurality of signal receiver branches,
a calculation unit for calculation of signal strength values for each incoming digital signal sample, and
a decision switch for evaluating the signal strength values of the digital signals from the respective signal receiver branches, and for deciding which one of the stored digital signals will be forwarded based on the evaluating for further processing in the receiver.

22. The receiver of claim 21, wherein each of the signal receiver branches comprises:
- an attenuator means for attenuating the amplitude of the incoming analog signal by a unique, predetermined value,
- an I/Q-demodulator to demodulate the analog signal to produce analog I- and Q-signals,
- an A/D converter for converting the analog I- and O-signals to I- and Q-digital signals,
- a digital signal processor in communication with the memory for filtering and amplification of the digital I- and Q- signals.

* * * * *